US010984187B2

(12) United States Patent
Lee

(10) Patent No.: US 10,984,187 B2
(45) Date of Patent: Apr. 20, 2021

(54) DEVICE FOR PROVIDING MESSENGER-BASED SERVICE AND METHOD USING SAME

(71) Applicant: LINE Corporation, Tokyo (JP)

(72) Inventor: Il Gu Lee, Tokyo (JP)

(73) Assignee: Line Corporation, Tokyo (JP)

( * ) Notice: Subject to any disclaimer, the term of this patent is extended or adjusted under 35 U.S.C. 154(b) by 99 days.

(21) Appl. No.: 15/827,107

(22) Filed: Nov. 30, 2017

(65) Prior Publication Data

US 2018/0101517 A1    Apr. 12, 2018

Related U.S. Application Data

(63) Continuation-in-part of application No. PCT/KR2016/005610, filed on May 27, 2016.

(30) Foreign Application Priority Data

Jun. 1, 2015    (KR) .......................... 10-2015-0077163

(51) Int. Cl.
   *G06F 40/186*  (2020.01)
   *G06F 16/23*   (2019.01)
   *H04L 12/58*   (2006.01)
   *H04L 29/08*   (2006.01)

(52) U.S. Cl.
   CPC ............ *G06F 40/186* (2020.01); *G06F 16/23* (2019.01); *H04L 51/00* (2013.01); *H04L 51/046* (2013.01); *H04L 67/18* (2013.01)

(58) Field of Classification Search
   CPC ........ G06F 40/186; H04L 51/00; H04L 67/18
   See application file for complete search history.

(56) References Cited

U.S. PATENT DOCUMENTS

| 9,031,216 | B1 * | 5/2015 | Kamvar | ................. G06F 16/951 |
| | | | | 379/202.01 |
| 9,031,586 | B1 * | 5/2015 | Kilpatrick | ............... H04W 4/18 |
| | | | | 455/466 |
| 10,068,174 | B2 * | 9/2018 | Aili | ........................ G06F 16/243 |
| 10,116,596 | B2 * | 10/2018 | Li | ............................ H04L 51/02 |

(Continued)

FOREIGN PATENT DOCUMENTS

| JP | 2005-011089 A  | 1/2005 |
| JP | 2005-301780 A1 | 10/2005 |

(Continued)

OTHER PUBLICATIONS

Gruber et al, Multi-Command Single Utterance Input Method, May 30, 2014, U.S. Appl. No. 62/005,556, all pages.*

(Continued)

*Primary Examiner* — Philip C Lee
(74) *Attorney, Agent, or Firm* — Harness, Dickey & Pierce, P.L.C.

(57) ABSTRACT

A device for providing a messenger-based service may include a template message provider configured to provide a template message including a keyword slot; a keyword determiner configured to determine a keyword corresponding to the keyword slot by using an input message received correspondingly to the template message; and a result message provider configured to provide a result message including information corresponding to the keyword.

14 Claims, 9 Drawing Sheets

(56) References Cited

U.S. PATENT DOCUMENTS

| | | | |
|---|---|---|---|
| 10,218,649 B2* | 2/2019 | Joo | H04L 51/02 |
| 2003/0182391 A1* | 9/2003 | Leber | G06F 16/951 |
| | | | 709/217 |
| 2005/0240413 A1 | 10/2005 | Asano et al. | |
| 2009/0006391 A1* | 1/2009 | Ram | G06F 16/35 |
| 2013/0144961 A1 | 6/2013 | Park et al. | |
| 2013/0275164 A1* | 10/2013 | Gruber | G06Q 10/02 |
| | | | 705/5 |
| 2013/0297317 A1* | 11/2013 | Lee | H04M 1/72552 |
| | | | 704/270.1 |
| 2014/0207882 A1 | 7/2014 | Joo et al. | |
| 2015/0348551 A1* | 12/2015 | Gruber | G06F 17/2705 |
| | | | 704/235 |
| 2016/0043975 A1 | 2/2016 | Park et al. | |

FOREIGN PATENT DOCUMENTS

| | | |
|---|---|---|
| JP | 2013-117938 A | 6/2013 |
| JP | 2014-142919 A1 | 8/2014 |
| KR | 10-2001-0096157 | 11/2001 |
| KR | 10-0571443 B1 | 4/2006 |
| KR | 10-2007-0011521 | 1/2007 |
| KR | 1020100041069 A | 4/2010 |
| KR | 10-2013-0061387 | 6/2013 |
| KR | 10-2014-0067678 | 6/2014 |

OTHER PUBLICATIONS

Jeami, "D2 Line Weather LINE Bot", http://jeami.tistory.com/165, Aug. 3. 2013.

KR Office Action dated Dec. 18, 2015 for KR Application No. 10-2015-0077163.

International Search Report PCT/ISA/210 for International Application No. PCT/KR2016/005610 dated Sep. 1, 2016.

Written Opinion of the International Searching Authority PCT/ISA/237 for International Application No. PCT/KR2016/005610 dated Sep. 1, 2016.

Japanese Office Action for JP 2017-561707 dated Jul. 21, 2020.

Japanese Office Action dated Jan. 5, 2021 for Japanese Application No. 2017-561707.

* cited by examiner

FIG. 5A
FIG. 5B
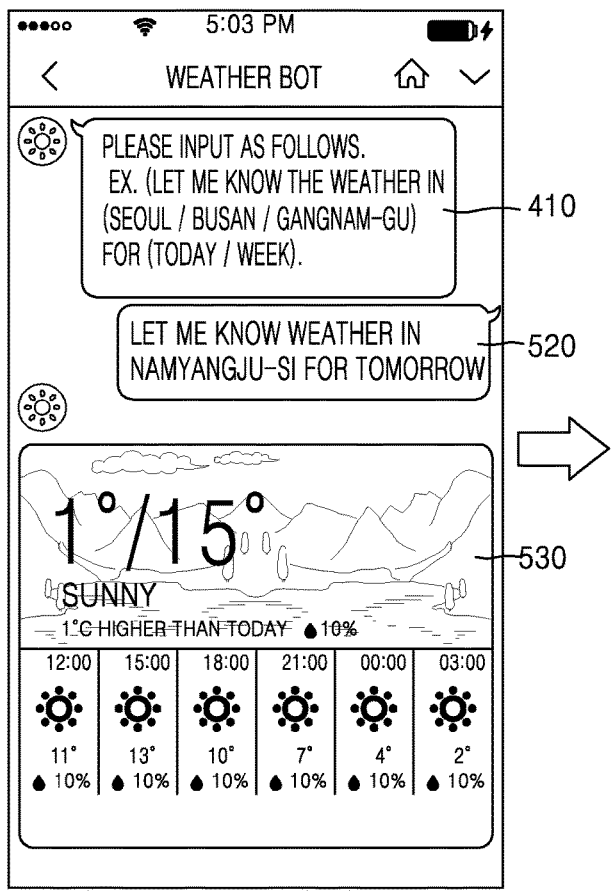
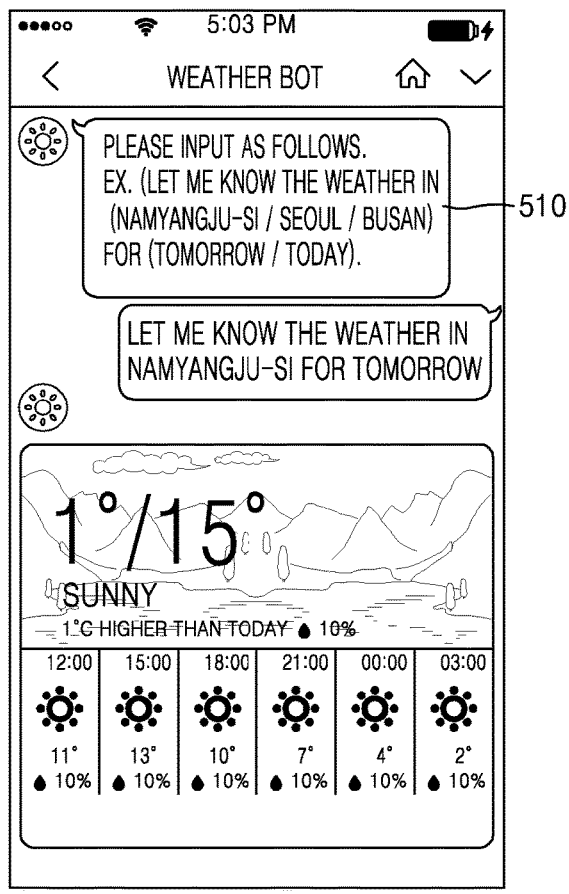

FIG. 6A
FIG. 6B
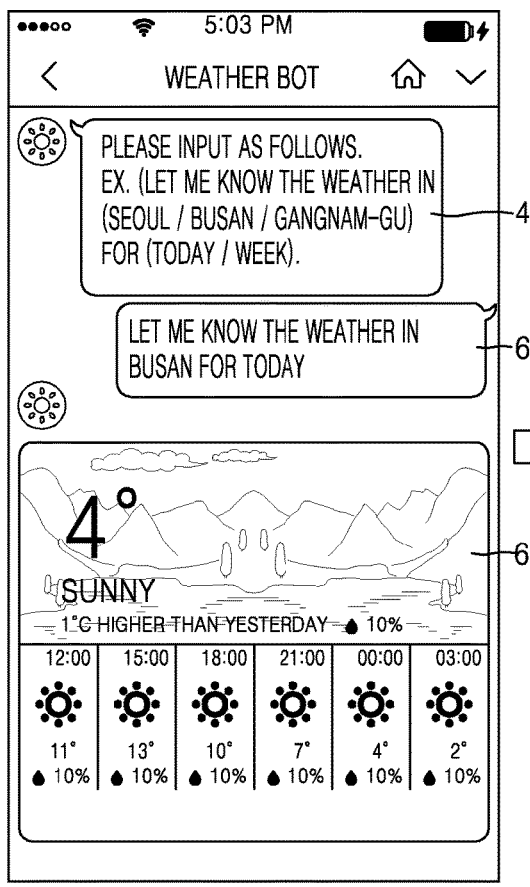
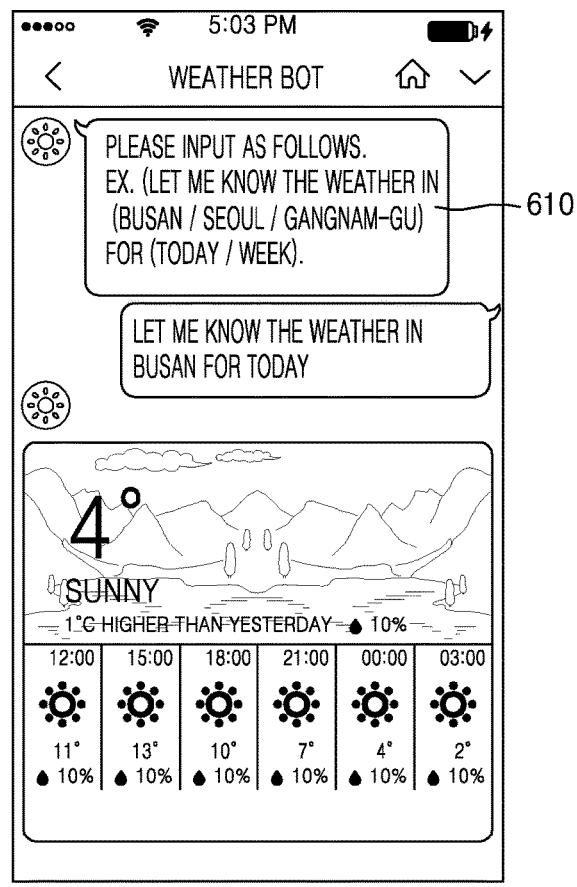

DEVICE FOR PROVIDING MESSENGER-BASED SERVICE AND METHOD USING SAME

CROSS-REFERENCE TO RELATED APPLICATIONS

This application is a continuation-in-part of, and claims the benefit of priority under 35 U.S.C. § 365(c) from, PCT International Application No. PCT/KR2016/005610 which has an International filing date of May 27, 2016, which designates the United States of America, and further claims priority under 35 U.S.C. § 119 to Korean Patent Application No. 10-2015-0077163 filed on Jun. 1, 2015, the contents of both of which are hereby incorporated by reference in their entirety.

TECHNICAL FIELD

At least some example embodiments relate to a device for providing a messenger-based service, a method of using the same and/or a non-transitory computer readable recording medium configured to perform the same. For example, at least some example embodiments relate to a device for providing a messenger-based service, which provides information desired by a user in a form of conversation in a messenger, a method of using the same and/or a non-transitory computer readable recording medium configured to perform the same.

BACKGROUND

Today, messenger services using communication networks have become more commonplace along with the rapid development of communication networks, such as the Internet. In other words, internet users may easily transmit and receive messages to and from other users anywhere at any time by using the Internet, and such messenger services have brought many changes to people's lives in general. In accordance with the development of mobile communication, these messenger services have been used as a popular communication method that transcends national borders, and the number of users using these messenger services is gradually increasing. In this regard, the number of messenger-based services is gradually increasing.

As such, messenger services are services that deliver information in a form of conversation between users.

Information disclosed in this Background section was already known to the inventors before achieving the disclosure or is technical information acquired in the process of achieving the disclosure. Therefore, it may contain information that does not form the prior art that is already known to the public in this country.

SUMMARY

Provided are a device for providing a messenger-based service, which provides information desired by a user in a form of conversation in a messenger, and/or a method using the same.

Also, provided are a device for providing a messenger-based service, which provides information desired by a user more quickly via one exchange of conversation by providing a template including a plurality of keyword slots to the user to induce the user to input the number of keywords equal to the number of keyword slots, and/or a method of using the same.

Also, provided are a device for providing a messenger-based service, which provides information desired by a user more quickly by providing a template including a plurality of keyword slots to the user while the user is able to input only keywords corresponding to the keyword slots in short answers, and/or a method of using the same.

Also, provided are a device for providing a messenger-based service, which provides information frequently used by a user more easily by inserting a keyword into a template and displaying the keyword frequently used by the user, and/or a method of using the same.

At least some example embodiments are directed to a device configured to provide a messenger-based service. In some example embodiments, the device includes a memory and a processor, the memory containing computer readable instructions executable by the processor to, generate a template message including a keyword slot, determine a keyword corresponding to the keyword slot based on an input message received from a user, the input message corresponding to the template message, and generate a result message including information corresponding to the keyword.

At least some example embodiments are directed to a method of providing a messenger-based service by a device, the device including a memory and a processor, the memory containing computer readable instructions executable by the processor. In some example embodiments, the method includes generating, by the processor, a template message including a keyword slot; determining, by the processor, a keyword corresponding to the keyword slot based on an input message received from a user corresponding to the template message; and generating, by the processor, a result message that includes information corresponding to the keyword.

At least some example embodiments are directed to a non-transitory computer-readable recording storing computer-readable instructions executable by a processor. In at least some example embodiments, the computer-readable instructions are executable to cause the processor to, generate a template message including a keyword slot; determine a keyword corresponding to the keyword slot based on an input message received from a user, the input message corresponding to the template message; and generate a result message including information corresponding to the keyword.

These and/or other aspects will become apparent and more readily appreciated from the following description of some example embodiments, taken in conjunction with the accompanying drawings.

A device for providing a messenger-based service and a method using the same, according to some example embodiments, may provide information desired by a user in a form of conversation in a messenger.

Also, a device for providing a messenger-based service and a method using the same, according to some example embodiments, may provide information desired by a user more quickly via one exchange of conversation by providing a template including a plurality of keyword slots to the user to induce the user to input the number of keywords equal to the number of keyword slots.

Also, a device for providing a messenger-based service and a method using the same, according to some example embodiments, may provide information desired by a user more quickly by providing a template including a plurality of keyword slots to the user while the user is able to input only keywords corresponding to the keyword slots in short answers.

Also, a device for providing a messenger-based service and a method using the same, according to some example embodiments, may provide information frequently used by a user more easily by inserting a keyword into a template and displaying the keyword frequently used by the user.

DESCRIPTION OF THE DRAWINGS

FIGS. 5A and 5B illustrate another example of the screen of the user terminal of FIG. 1 where the instant messaging application is executed.

FIGS. 6A and 6B illustrate another example of the screen of the user terminal of FIG. 1 where the instant messaging application is executed.

DETAILED DESCRIPTION

Figure 1:
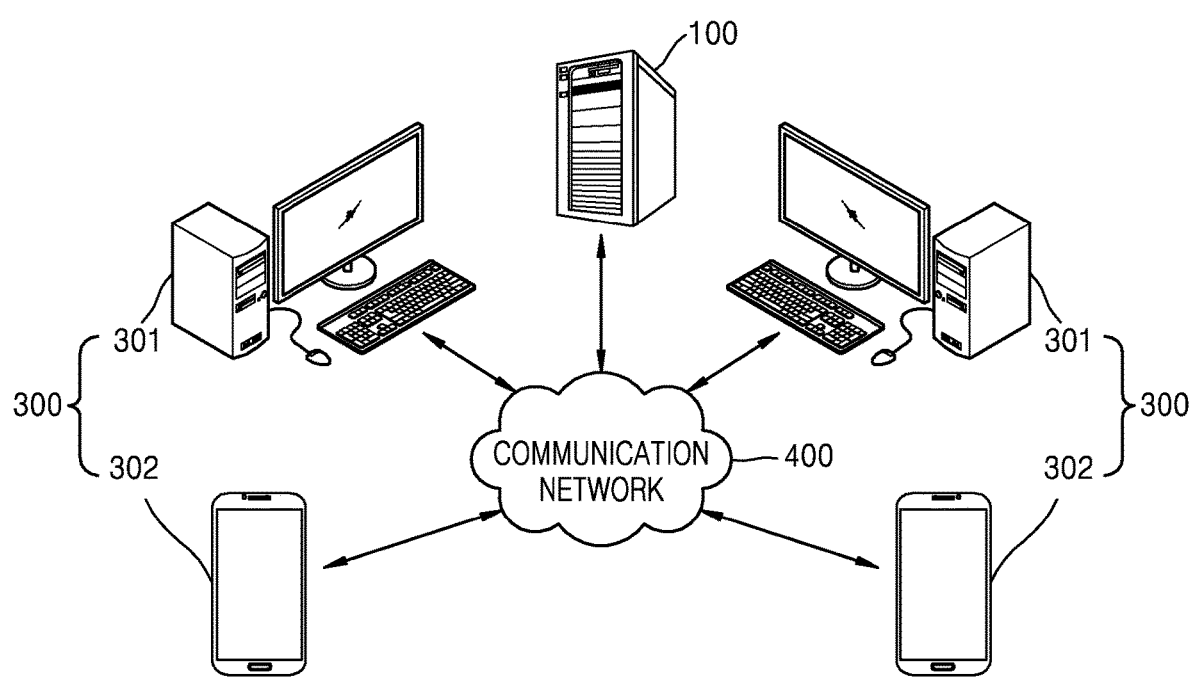
FIG. 1 is a diagram of a configuration of a system for providing a messenger-based service, according to some example embodiments.

As the disclosure allows for various changes and numerous example embodiments, some particular example embodiments will be illustrated in the drawings and described in detail in the written description. Advantages and features of the example embodiments and methods of accomplishing the same may be understood more readily by reference to the following detailed description of the example embodiments and the accompanying drawings. In this regard, the present example embodiments may have different forms and should not be construed as being limited to the descriptions set forth herein.

While such terms as "first", "second", etc., may be used to describe various components, such components must not be limited to the above terms. The above terms are used only to distinguish one component from another. An expression used in the singular encompasses the expression of the plural, unless it has a clearly different meaning in the context. In the present specification, it is to be understood that terms such as "including" or "having," etc., are intended to indicate the existence of features or components, and are not intended to preclude the possibility that one or more other features or components may exist or may be added. In the drawings, for convenience of description, sizes of components may be exaggerated for clarity. For example, since sizes and thicknesses of components in drawings are arbitrarily shown for convenience of description, the sizes and thicknesses are not limited thereto.

Hereinafter, one or more example embodiments will be described in detail with reference to accompanying drawings. Those components that are the same or are in correspondence are rendered the same reference numeral regardless of the figure number, and redundant explanations are omitted.

FIG. 1 is a diagram of a configuration of a system 1 for providing a messenger-based service, according to some example embodiments.

Referring to FIG. 1, the system 1 according to some example embodiments may include a device 100 for providing a messenger-based service and user terminals 300. Also, the system 1 may include a communication network 400 connecting the user terminals 300 and the device 100 to each other.

The device 100 according to some example embodiments provides particular information to a user through an instant messaging application installed in the user terminal 300. In detail, the device 100 suggests a template message in a chat window of the instant messaging application, determines a keyword from an input message received from the user in response to the template message, and provides information corresponding to the keyword to the chat window.

Here, the device 100 according to some example embodiments may provide a software robot function for providing the particular information. For example, the device 100 may provide a software robot function for providing weather information, a software robot function for providing stock information, etc. A software robot denotes a program operating by mimicking actions of the user, and in the present disclosure, may denote a program performing a role of exchanging messages with the user by mimicking actions of a chat partner in a messenger.

The user may invite a particular software robot providing particular information to a chat room as a chat partner by using the instant messaging application, input an inquiry message upon receiving a template message from the software robot, and receive a result corresponding to the inquiry message.

Here, the software robot function provided by the device 100 of some example embodiments may provide an advertisement, a general search service, and various other services enhancing user convenience. In other words, the device 100 of some example embodiments may be a server providing the software robot function of providing various services, such as an advertisement service, a search service, an email service, a blog service, a social network service, a news service, and a shopping service. Also, the software robot function provided by the device 100 of some example embodiments may be applied not only to a messenger, but also to various interfaces, such as a search interface, a voice recognition interface, and a command interface in Internet of things (for example, a command interface applied when controlling a refrigerator by using a smart phone) in various terminal applications.

The plurality of user terminals 300 each denote a communication terminal capable of using the instant messaging application in a wired/wireless communication environment. Here, the user terminal 300 may be a personal computer (PC) 301 of the user or a mobile terminal 302 of the user. In FIG. 1, the mobile terminal is illustrated as a smart phone, but example embodiments are not limited thereto, and a terminal installed with the instant messaging application as described above may be unlimitedly employed.

In more detail, the user terminal 300 may include a computer (for example, a desktop computer, a laptop computer, or a tablet computer), a media computing platform (for example, a cable, a satellite setup box, or a digital video recorder), a handheld computing device (for example, a portable digital assistant (PDA), an email client, an arbitrary form of a mobile phone, or an arbitrary form of another type of computing or communication platform, but is not limited thereto.

Meanwhile, the communication network 400 connects the plurality of user terminals 300 with the device 100. In other words, the communication network 400 denotes a communication network that provides an access path for the user terminals 300 to access and then exchange data with the device 100. The communication network 400 may be a wired network, such as a local area network (LAN), a wide area network (WAN), a metropolitan area network (MAN), or an integrated service digital network (ISDN), or a wireless network, such as a wireless LAN, CDMA, Bluetooth, or satellite communication, but example embodiments are not limited thereto.

Figure 2:
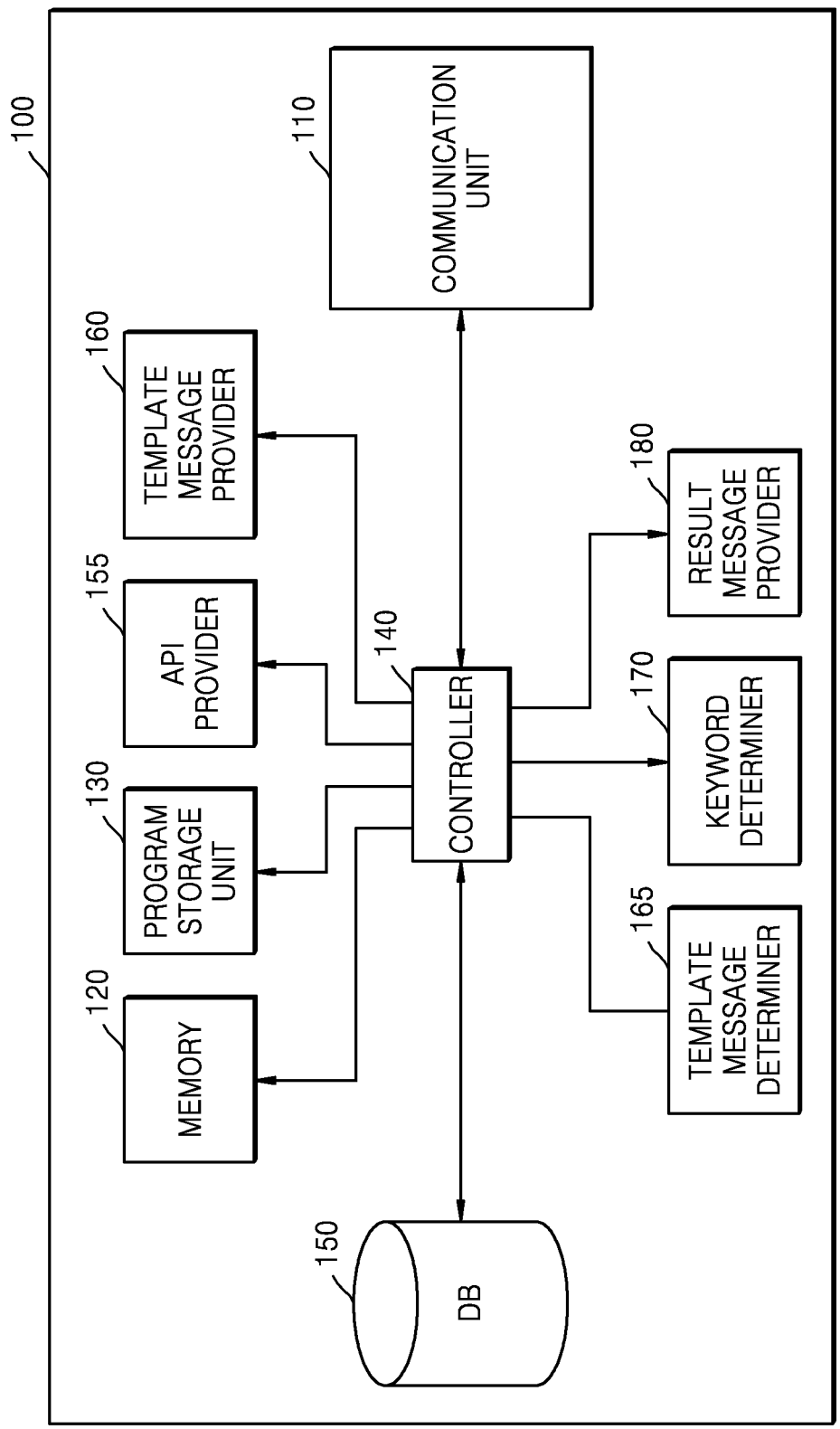
FIG. 2 is a block diagram of an example of an internal structure of a device for providing a messenger-based service of FIG. 1.

FIG. 2 is a block diagram of an example of an internal structure of the device 100 for providing a messenger-based service of FIG. 1.

Referring to FIG. 2, the device 100 may include a communication unit 110, a memory 120, a program storage unit 130, a controller 140, a database (DB) 150, an application program interface (API) provider 155, a template message provider 160, a template message determiner 165, a keyword determiner 170, and a result message provider 180.

The communication unit 110 provides a communication interface required to provide transmission and reception signals between the device 100 and the user terminal 300 in a packet data form, by interworking with the communication network 400. In addition, the communication unit 110 may transmit a template message to the user terminal 300, receive an input message corresponding to the template message from the user terminal 300, or transmit a result message corresponding to the input message to the user terminal 300.

Here, the communication unit 110 may be a device including hardware and software configured to transmit and/or receive a signal, such as a control signal or a data signal, to and from another network device via wired/wireless connection.

The memory 120 temporarily or permanently stores data processed by the controller 140. Here, the memory 120 may include a magnetic storage medium or a flash storage medium, but example embodiments are not limited thereto. For example, the memory 120 may be embodied as various non-transitory computer-readable media including magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The non-transitory computer-readable media may also be a distributed network, so that the program instructions are stored and executed in a distributed fashion.

In some example embodiments, the database (DB) 150 and program storage unit 130, discussed herein may be embodied by the hardware of the memory 120.

The program storage unit 130 may store control software performing an operation of generating a template message, an operation of determining a keyword, etc.

The controller 140, as a type of central processing unit, controls overall processes of transmitting the template message to the user terminal 300, determining a keyword, and providing the result message. In other words, the controller 140 may provide various functions of driving the control software stored in the program storage unit 130 and controlling the template message provider 160, the keyword determiner 170, and the result message provider 180 to generate and transmit the template message, determine the keyword by receiving the input message corresponding to the template message, generate and transmit the result message by obtaining information corresponding to the keyword, and update a keyword group to be used to generate the template message based on keyword determination history information.

Here, the controller 140 may include any type of device capable of processing data, such as a processor. Here, the 'processor' may be, for example, a data processing device embedded in hardware and having a circuit physically structured to perform a function expressed in a code or command included in a program. As such, examples of the data processing device embedded in hardware may include processing devices, such as a microprocessor, a central processing unit (CPU), a processor core, a multiprocessor, an application-specific integrated circuit (ASIC), and a field programmable gate array (FPGA), but example embodiments are not limited thereto.

In some example embodiments, the controller 140 may execute computer readable code from, for example, the memory 120, that configures the controller 140 as a special purpose computer to perform the functions the API provider 155, template message provider 160, template message determiner 165, keyword determiner 170 and/or the result message provider 180.

As such, in some example embodiments, the controller 140 may generate a template message that includes a keyword slot, determine a keyword input by a user into the keyword slot of the template message based on an input message received from the user, and generate a result message including information corresponding to the keyword. Therefore, the special purpose processor within the controller 140 may improve the functioning of the system 1 itself by quickly providing a user with desired information via conducting a conversation with the user via a template message.

The DB 150 may include a template DB storing information about a template for providing particular information, information about a keyword slot included in the template, and keyword choice information insertable into the keyword slot. For example, the template DB may store location information of a keyword slot in each template, and mapping information between a keyword slot and a keyword choice.

According to some example embodiments, the DB 150 may further include a history DB storing information about a keyword determination history. For example, the history DB may store words input by users correspondingly to a particular template message, and the number of times each of the words is determined as a keyword.

According to some example embodiments, the DB 150 may include a failure log DB preparing and storing a failure log when an input message does not correspond to a template message or when information corresponding to a keyword included in an input message does not exist.

The API provider 155 provides an API for modifying the template DB. For example, the API provider 155 may provide an API to the user, and the user may modify the template DB by using the API. In detail, the user may register information about weather-related templates in the template DB by using the API such that the device 100 may provide a software robot function of providing weather information, and register information about stock-related templates such that the device 100 may provide a software robot function of providing stock information. In other words, the user may use the API to register information in the template DB so as to generate a bot providing a template related to the information and result information related to the information.

As such, the device 100 according to some example embodiments provides an API to a third party such that the third party generates a bot capable of providing content suitable for the third party's service.

The template message provider 160 provides a template message including a keyword slot. For example, the keyword slot may denote a section into which a keyword is insertable, such as '( )' in the template message, such as 'let me know the weather in ( )''. An example in which the keyword slot is displayed in a '( )' sign in a phrase is described, but the sign for displaying the keyword slot is not limited thereto. For example, the keyword slot may be displayed by using a '[ ]' sign, such as 'let me know the weather in [ ]', or the keyword slot may be displayed by using a '_' sign, such as 'let me know the weather in '_'. The template message provider 160 may generate the template message by using the template DB.

The template message provider 160 may provide a template message including a plurality of keyword slots. For example, the template message provider 160 may provide a template message including at least two keyword slots, such as 'let me know the weather in ( ) for ( )'.

As such, a device for providing message-based information, according to some example embodiments, may quickly provide information desired by a user via only one exchange of conversation by providing a template including a plurality of keyword slots to the user, so as to induce the user to input the number of keywords equal to the number of keyword slots.

According to some example embodiments, the template message may include at least one keyword slot, and the template message provider 160 may generate the template message by inserting at least one keyword choice to a keyword slot. For example, the template message may include two keyword slots, wherein three keyword choices may be inserted into a first keyword slot from the keyword slots and two keyword choices may be inserted into a second keyword slot. In detail, in a template message, such as 'let me know the weather in ( ) for ( )', when the first '( )' is a first keyword slot and the second '( )' is a second keyword slot, three keyword choices, such as 'Seoul', 'Busan', and 'Gangnam-go' may be inserted into the first keyword slot, and two keyword choices, such as 'today' and 'a week' may be inserted into the second keyword slot, and thus a template message, such as 'let me know the weather in (Seoul/Busan Gangnam-go) for (today/a week)' may be generated. Hereinabove, the keyword choices are distinguished by using a '/' sign in the keyword slot, such as in '(Seoul/Busan/Gangnam-go)', but the sign distinguishing the keyword choices is not limited thereto. For example, a '|' sign may be used as the sign distinguishing the keyword choices, such as in '(Seoul|Busan|Gangnam-go)'.

According to some example embodiments, the template message provider 160 may select a keyword choice from a keyword group corresponding to a keyword slot, and insert the selected keyword choice into the keyword slot. For example, in the template message, such as 'let me know the weather in ( ) for ( )', a keyword group corresponding to the first keyword slot may include region names, such as 'Seoul', 'Busan', 'Gangnam-go', and 'Namyangju-si', a keyword group corresponding to the second keyword group may include period units, such as 'today', 'tomorrow', 'week', and 'month', and the template message provider 160 may select a keyword choice from the keyword group corresponding to each keyword slot.

According to some example embodiments, the template message provider 160 may generate the template message corresponding to an inquiry message received before the template message is generated. For example, when the user inputs the inquiry message of 'typhoon', the template message provider 160 may generate the template message as '(will/did) typhoon come (when/yesterday/today/tomorrow/short answer)?'.

According to some example embodiments, the template message provider 160 may generate the template message based on activity information of the user. For example, first, when the user inputs an inquiry message of 'he' without activity information of the user, the template message provider 160 may generate a template message, such as 'help' or 'Hertz stock information'. Then, when the user logs into a stock service and then inputs the inquiry message of 'he', the template message provider 160 may generate a template message, such as 'Hertz stock information' or 'add Hertz to bookmark'. Then, when the user adds Hertz to a bookmark and then inputs the inquiry message of 'he', the template message provider 160 may generate a template message, such as 'remove Hertz from bookmark' or 'Hertz stock information'.

According to some example embodiments, the template message provider 160 may provide a plurality of template phrases. For example, when the user inputs the inquiry message of 'typhoon', the template message provider 160 may generate a plurality of template phrases related to a typhoon, such as "(will/did) typhoon come (when/yesterday/today/tomorrow/short answer)?', '(to/from which country/direction/short answer) typhoon (will go/has passed/has come)?', 'will typhoon (warning/watch/short answer) (be issued/lifted)?', and '(what is/how do you measure) (strength/central pressure/cause/translation) of typhoon?'. Such template phrases may be provided by be being included in one template message or in separate template messages.

According to some example embodiments, the template message provider 160 may provide a guide message corresponding to a keyword slot of a template message. For example, a guide message, such as 'please input field' may be provided according to an '(electronic/chemical/mechanical)' slot in a template message of 'please suggest (10) (ceiling/floor) items of the (electronics/chemical/mechanical) field today'.

According to some example embodiments, the template message provider 160 may select a keyword choice while varying priorities of keyword choices included in a keyword group according to keyword determination history information. For example, the template message provider 160 may assign a higher priority to a keyword choice that has a greater number of times of being determined as a keyword. In detail, when the number of times that 'Namyangju-si', 'Seoul', 'Busan', and 'Kangnam-gu' are determined as a keyword correspondingly to a first keyword slot of a template message, such as 'let me know the weather in (Seoul/Busan Gangnam-go) for (today/a week)', are respectively 20, 10, 5, and 2, the template message provider 160 may determine the priorities in an order of 'Namyangju-si', 'Seoul', 'Busan', and 'Kangnam-gu' with respect to the first keyword slot. In addition, when three keyword choices are inserted into the first keyword slot, the template message provider 160 may generate a template message, such as 'let me know the weather in (Namyangju-si/Seoul/Busan) for (today/a week)', by considering the above priorities.

According to a selective embodiment, the template message provider 160 may vary an insertion order of keyword choices inserted into a keyword slot, according to keyword determination history information. For example, the template message provider 160 may insert, in front of the keyword slot, the keyword choices inserted into the keyword slot in an order in which the keyword choices were recently input. In detail, in three cases in which a keyword most recently determined correspondingly to a first keyword slot of a template message, such as 'let me know the weather in (Seoul/Busan/Gangnam-go) for (today/a week)' is in an order of 'Gangnam-go', 'Seoul', and 'Busan', the template message provider 160 may determine an insertion order in an order of 'Busan', 'Seoul', and 'Gangnam-go' with respect to the first keyword slot. Moreover, when three keyword choices are inserted into the first keyword slot, the template message provider 160 may generate a template message, such as 'let me know the weather in (Busan/Seoul/Gangnam-go for (today/a week)', by considering such an insertion order.

In other words, keyword determination history information may include information about words input by users correspondingly to a particular template message and about the number of times each of the words is determined as a keyword, and even when the same template messages are provided to the users, the template message provider 160 may provide the template messages having different keyword choices or different orders of keyword choices to the users if keyword determination history information of the users is different.

According to some example embodiments, the template message provider 160 may vary selection priorities of keyword choices included in a keyword group or vary an insertion order of keyword choices inserted into a keyword slot, according to one or more users, a location of a user, and a time zone in which a template message is provided. For example, the template message provider 160 may generate a template message with respect to one user by first selecting a keyword choice corresponding to a location where the user is located, or inserting the keyword choice into the front of the order. In detail, when the user is located in Gangam-gu, Seoul, the template message provider 160 may provide a template message, such as 'let me know the weather in (Seoul/Gangnam-go Busan) for (today/a week)', and when the user is located in Busan, the template message provider 160 may provide a template message, such as 'let me know the weather in (Busan/Seoul/Gangnam-go) for (today/a week)'

The keyword determiner 170 determines a keyword corresponding to a keyword slot by using an input message input correspondingly to a template message. For example, when an input message, such as 'let me know the weather in Seoul for today', is received correspondingly to a template message, such as 'let me know the weather in (Seoul/Busan/Gangnam-go) for (today/a week)', the keyword determiner 170 may determine 'Seoul' and 'today' as keywords corresponding to keyword slots.

According to some example embodiments, a template message may be displayed in a chat window. In this case, an input message may be input as a user directly inputs the input message to a chat input window, the user selects a keyword slot of the template message displayed in the chat window and inputs a word, or the user selects the keyword slot and selects one of keyword choices displayed in a separate popup window.

According to some example embodiments, a template message may be displayed in a chat input window. In this case, an input message may be input as a user selects a keyword slot of the template message displayed in the chat window and inputs a word, or as the user selects the keyword slot and selects one of keyword choices displayed in a separate popup window, According to a selective embodiment, a keyword slot of a template message displayed in a chat input window may be displayed blank. For example, a template message, such as 'please suggest (10) (ceiling/floor) items of the (electronics/chemical/mechanical) field today', may be displayed in a chat window, and a template message, such as 'please suggest ( ) ( ) items of the ( ) field today', may be displayed in a chat input window. When a keyword slot is displayed blank, a guide message related to a word to be input by a user to the keyword slot, or a choice to be selected from the keyword slot may be displayed. For example, a guide message, such as 'please input field' may be displayed according to a '( ) field' slot of a template message displayed in a chat input window.

According to some example embodiments, the keyword determiner 170 may determine, from among words included in an input message, a word that is the same as one or more of keyword choices included in a keyword group as a keyword. For example, when an input message, such as 'let me know the weather in Namyangju-si for today' is input correspondingly to a template message, such as 'let me know the weather in (Seoul/Busan/Gangnam-go) for (today/a week)', and a keyword group corresponding to a first keyword slot includes region names, such as 'Seoul', 'Busan', 'Gangnam-go', and 'Namyangju-si', as keyword choices, the keyword determiner 170 may determine 'Namyangju-si' as a keyword since 'Namyandu-si' included in the input message is the same word as the keyword choice. Similarly, when a keyword group corresponding to a second keyword slot includes periods, such as 'today', 'tomorrow', 'week', and 'month', as keyword choices, since 'today' included in the input message is the same word as the keyword choice, 'today' may be determined as a keyword. Moreover, even when a short answer input message, such as 'Seoul week', is received correspondingly to a template message, such as 'let me know the weather in (Seoul/Busan/Gangnam-go) for (today/a week)', the keyword determiner 170 may determine 'Seoul' and 'week' as keywords since 'Seoul' and 'week' are the same words as choices of the keyword groups respectively corresponding to the first keyword slot and the second keyword slot.

According to some example embodiments, the keyword determiner 170 may determine, as a keyword, a word directly input by the user to a keyword slot.

The result message provider 180 provides a result message including information corresponding to a keyword. For example, the device 100 according to some example embodiments may provide a software robot function of providing weather information, and when 'Seoul' and 'today' are determined as keywords, the result message provider 180 may generate and provide a result message including today's weather information for Seoul.

According to some example embodiments, when information corresponding to a keyword does not exist, the result message provider 180 may arbitrarily determine a keyword including information corresponding to the keyword, and provide, as a result message, a feedback message including a template message including the arbitrarily determined keyword. For example, when a user inputs an input message, such as 'let me know the weather in my town for today', correspondingly to a template message 'let me know the weather in (Seoul/Busan Gangnam-go) for (today/a week)', and information corresponding to 'my town' does not exist, the result message provider 180 may provide, as a result message, a feedback message, such as 'is inquiry "let me know the weather in Guro-gu for today"?'.

As such, the device 100 according to some example embodiments quickly provides information desired by a user only via one exchange of conversation by providing a template message to the user, determining a keyword from an input message when the user inputs the input message according to the template message, and providing information corresponding to the keyword. Also, the device 100 enables the user to easily check frequently used information by inserting, into a template, and displaying a keyword frequently used by the user.

Figure 3:
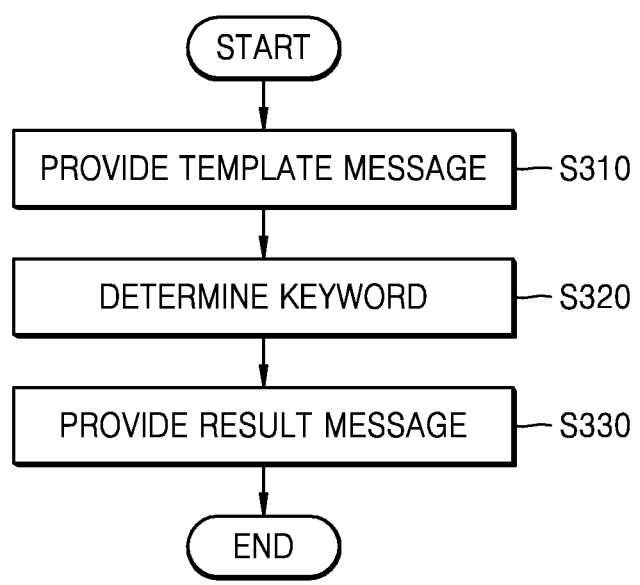
FIG. 3 is a flowchart of a method of providing a messenger-based service, according to some example embodiments.

FIG. 3 is a flowchart of a method of providing a messenger-based service, according to some example embodiments.

Referring to FIG. 3, the method according to some example embodiments includes providing (S310), by the template message provider 160, a template message, determining (S320), by the keyword determiner 170, a keyword, and providing (S330), by the result message provider 180, a result message.

For example, in operation S310, the processor 100 of the device 100 may execute instructions to perform the functions of the template message provider 160 and provide a template message including a keyword slot to the user terminal 300. The template message provider 160 may generate the template message by inserting a keyword choice to a keyword slot, and may variously determine keyword selection or a keyword insertion order while considering keyword determination history information.

In operation S320, the processor 100 of the device 100 may execute instructions to perform the functions of the keyword determiner 170 and receive an input message received from the user terminal 300 correspondingly to the template message generated in operation S310, and determine a keyword corresponding to the keyword slot by using the input message. The keyword determiner 170 may determine, as a keyword, a word that is the same as one or more keyword choices included in a keyword group, from among words included in the input message.

In operation S330, the processor 100 of the device 100 may execute instructions to perform the functions of the result message provider 180 to provide, to the user terminal 300, a result message including information corresponding to the keyword determined in operation S320.

Figure 4:
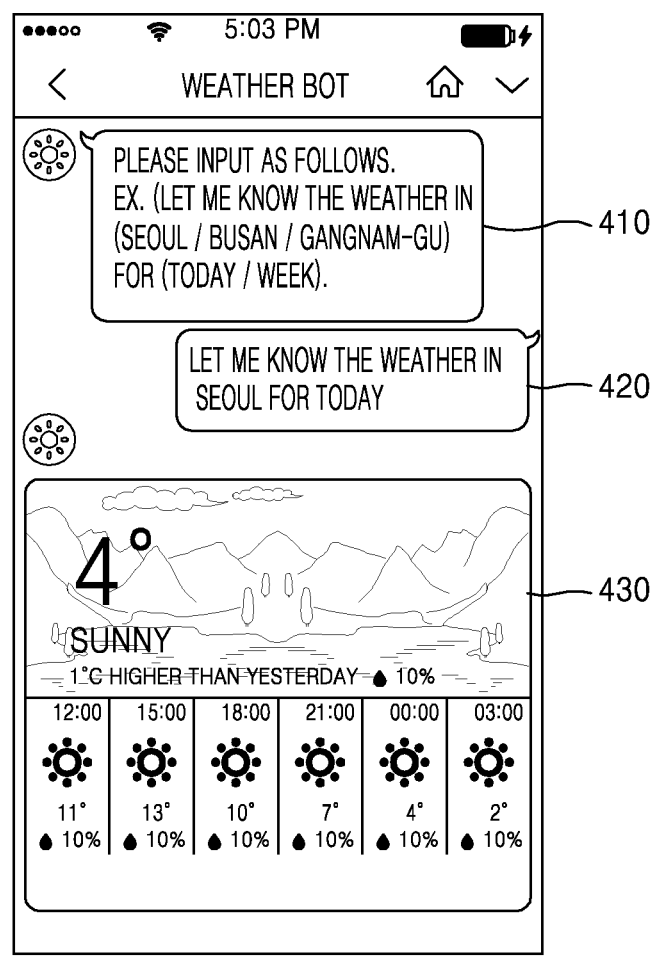
FIG. 4 illustrates an example of a screen of a user terminal of FIG. 1 where an instant messaging application is executed.

FIG. 4 illustrates an example of a screen of the user terminal 300 of FIG. 1 where an instant messaging application is executed.

Referring to FIG. 4, it is determined that the device 100 of FIG. 1 provides weather information to a user through a software robot (hereinafter, referred to as a 'weather bot') providing weather information.

First, the weather bot may display a template message 410 including a phrase, such as 'let me know the weather in (Seoul/Busan/Gangnam-go) for (today/a week)', to induce an input of the user.

When the user inputs an input message 420, such as 'let me know the weather in Seoul for today', correspondingly to the template message 410, the weather bot may determine 'Seoul' and 'today' as keywords from the input message 420, and display information about today's weather in Seoul based on the determined keywords in a form of a result message 430.

As such, a device for providing message-based information, according to some example embodiments, may quickly provide information desired by a user via only one exchange of conversation by providing a template including a plurality of keyword slots to the user to induce the user to input the number of keywords equal to the number of keyword slots. In addition, by completing one sentence by inducing character input of the user according to a grammatical system understandable by a bot, inconvenience of the user having to obtain the desired information based on a plurality of keywords input by receiving guides several times from the bot may be avoided.

FIGS. 5A and 5B illustrate another example of the screen of the user terminal 300 of FIG. 1 where an instant messaging application is executed.

Referring to FIG. 5A, a weather bot may display the template message 410 including the phrase such as 'let me know the weather in (Seoul/Busan/Gangnam-go) for (today/a week)', to induce an input of a user.

When the user inputs an input message 520, such as 'let me know the weather in Namyangju-si for tomorrow', correspondingly to the template message 410, the weather bot may determine 'Namyangju-si' and 'tomorrow' as keywords from the input message 520, and display information about tomorrow's weather in Namyangju-si based on the determined keywords in a form of a result message 530.

When the case of FIG. 5A is repeated, and thus 'Namyangju-si' and 'tomorrow', which were not inserted into keyword slots, are repeatedly determined as keywords, the weather bot may first select and insert, into the keyword slots, 'Namyangju-si' and 'tomorrow'.

In this case, as shown in FIG. 5B, the weather bot may change the template message 410 to a template message 510 including a phrase, such as 'let me know the weather in (Namyangju-si/Seoul/Busan) for (tomorrow/today)', and display the template message 510.

As such, a device for providing message-based information, according to some example embodiments, may enable a user to easily check frequently used information by inserting a keyword repeatedly input by the user into a template and providing the template.

FIGS. 6A and 6B illustrate another example of the screen of the user terminal of FIG. 1 where the instant messaging application is executed.

Referring to FIG. 6A, a weather bot may display the template message 410 including a phrase such as 'let me know the weather in (Seoul/Busan/Gangnam-go) for (today/a week)', to induce an input of a user.

When the user inputs an input message 620, such as 'let me know the weather in Busan for today', correspondingly to the template message 410, the weather bot may determine 'Busan' and 'today' as keywords from the input message 620, and display information about today's weather in Busan based on the determined keywords in a form of a result message 630.

When the case of FIG. 6A is repeated, and thus 'Busan', which is inserted into a first keyword slot, is repeatedly determined as a keyword, the weather bot may change a position of 'Busan' from among keyword choices inserted into the first keyword slot to the front.

In this case, as shown in FIG. 6B, the weather bot may change the template message 410 to a template message 610 including a phrase such as 'let me know the weather in (Busan/Seoul/Gangnam-go) for (today/a week)', and display the template message 610.

As such, a device for providing message-based information, according to some example embodiments, may enable a user to easily check frequently used information by providing a keyword repeatedly input by the user at the front of keyword choices.

Figure 7:
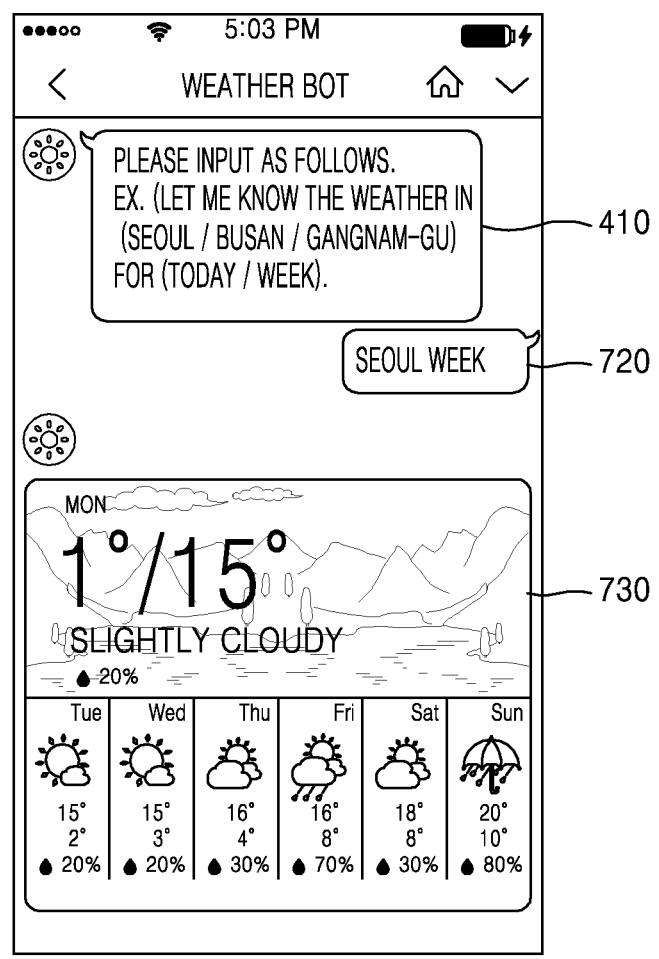
FIG. 7 illustrates another example of the screen of the user terminal of FIG. 1 where the instant messaging application is executed.

FIG. 7 illustrates another example of the screen of the user terminal of FIG. 1 where the instant messaging application is executed.

Referring to FIG. 7, a weather bot may display the template message 410 including the phrase such as 'let me know the weather in (Seoul/Busan Gangnam-go) for (today/a week)', to induce an input of a user.

When the user inputs an input message 720 of a short answer, such as 'Seoul week', correspondingly to the template message 410, the weather bot may determine 'Seoul' and 'week' as keywords from the input message 720, and display information about the weather for a week in Seoul based on the determined keywords in a form of a result message 730.

As such, a device for providing message-based information, according to some example embodiments may quickly provide information desired by a user by providing a template including a plurality of keyword slots to the user while enabling the user to input only keywords corresponding to the keyword slots in short answers.

Figure 8:
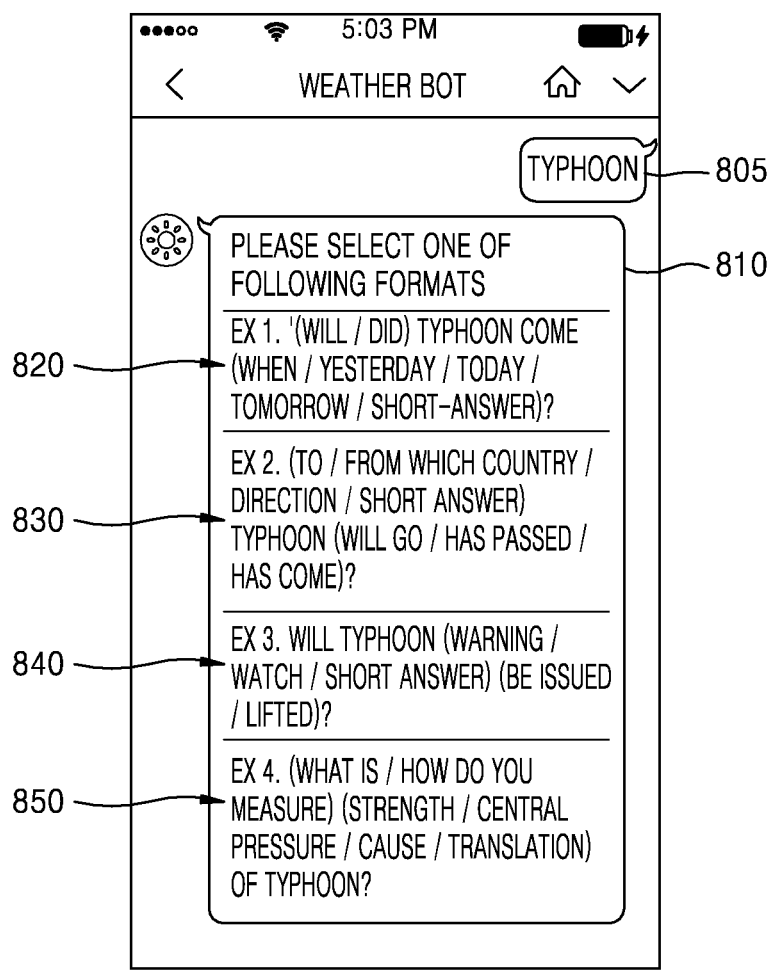
FIG. 8 illustrates another example of the screen of the user terminal of FIG. 1 where the instant messaging application is executed.

FIG. 8 illustrates another example of the screen of the user terminal of FIG. 1 where the instant messaging application is executed.

Referring to FIG. 8, a weather bot may display a template message 810 correspondingly to an inquiry message 805 of a user. For example, when the inquiry message 805 of the user is a phrase, such as 'typhoon', the weather bot may display the template message 810 including a template phrase, such as '(will/did) typhoon come (when/yesterday/today/tomorrow short answer)?' 820, in relation to a typhoon.

Here, the weather bot may display the template message 810 including a plurality of template phrases. For example, the weather bot may display the template message 810 including four template phrases, such as '(will/did) typhoon come (when/yesterday/today tomorrow/short-answer)?' 820, '(to/from which country/direction/short answer) typhoon (will go/has passed/has come)?' 830, 'will typhoon (warning/watch/short answer) (be issued/lifted)?' 840, and '(what is how do you measure) (strength/central pressure/cause/translation) of typhoon'? 850.

Although not shown in FIG. 8, the four template phrases may be displayed as separate template messages.

As such, a device for providing message-based information, according to some example embodiments, may enable a user to easily determine a grammatical system understandable by a bot by providing a plurality of template phrases in response to an inquiry message of the user.

Figure 9:
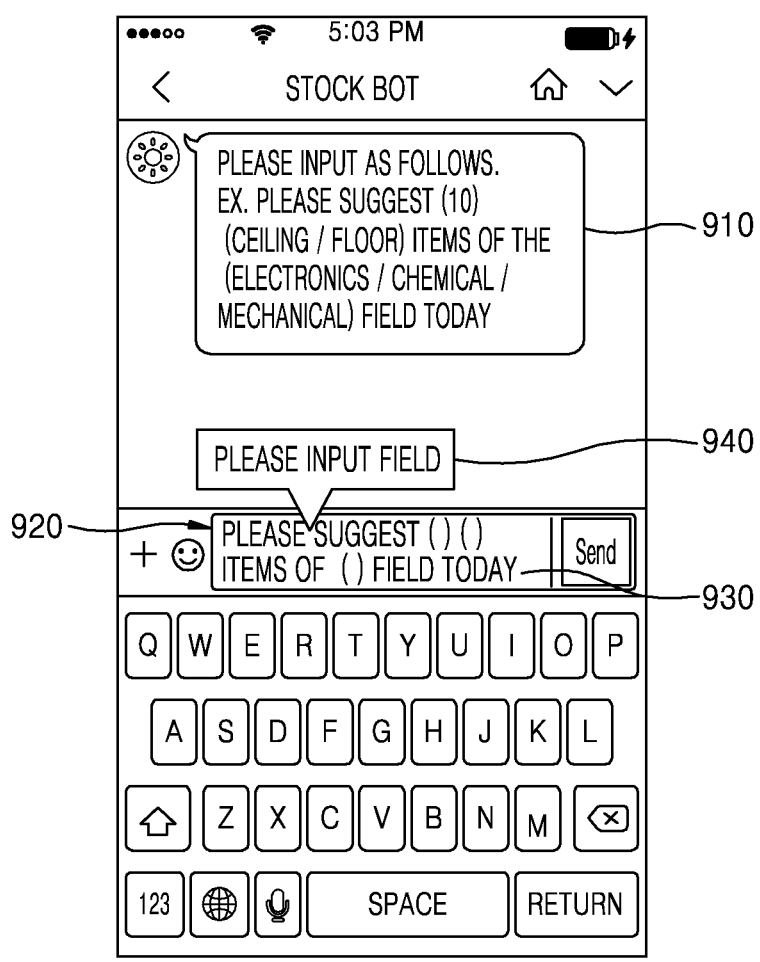
FIG. 9 illustrates another example of the screen of the user terminal of FIG. 1 where the instant messaging application is executed.

FIG. 9 illustrates another example of the screen of the user terminal of FIG. 1 where the instant messaging application is executed.

First, in order to induce an input of a user, a stock bot may display a template message 910 including a phrase, such as 'please suggest (10) (ceiling/floor) items of the (electronics/chemical/mechanical) field today' in a chat window, and display a template message 930, such as 'please suggest ( ) ( ) items of the ( ) field today', having blank keyword slots in a chat input window 920.

The user may complete an input message by selecting a keyword slot of the template message 930 displayed in the chat input window 920, and inputting a word corresponding to the keyword slot without having to directly input all of an input message, such as 'please suggest 10 ceiling items of the electronics field today', in response to the template message 910. In detail, the user may input the input message, such as 'please suggest 10 ceiling items of the electronics field today' by selecting '( ) field' of the template message 930 to input 'electronics', selecting '( )' item' to input 'ceiling', and selecting '( )' to input '10'.

When the user selects '( ) field', a guide message corresponding to the keyword slot may be displayed in a popup form. For example, when the user selects '( ) field', a guide message, such as 'please input field', may be displayed; when the user selects '( ) items', a guide message, such as 'please input "ceiling" or "floor"', may be displayed; and when the user selects '( )', a guide message, such as 'please input number of items', may be displayed.

As such, a device for providing message-based information, according to some example embodiments, may quickly provide information desired by a user by displaying a template phrase including a keyword slot in a chat input window, and completing an input message when only a word corresponding to the keyword slot is received.

According to a method of providing a messenger-based service, according to some example embodiments, information desired by a user may be quickly provided via only one exchange of conversation, and information frequently used by the user may be easily provided by inserting a keyword frequently used by the user into a template and displaying the template.

The methods described above may be recorded on a computer-readable recording medium by being implemented in computer programs executed by using various computers. The computer-readable recording medium may include at least one of a program command, a data file, and a data structure. The program commands recorded in the computer-readable recording medium may be specially designed or well known to one of ordinary skill in the computer software field. Examples of the computer-readable recording medium include read-only memory (ROM), random-access memory (RAM), CD-ROMs, magnetic tapes, floppy disks, optical data storage devices, etc. Examples of the computer command include mechanical codes prepared by a compiler, and high-level languages executable by a computer by using an interpreter. The hardware device may be configured to operate as at least one software module to perform operations of the methods, or vice versa.

The particular implementations shown and described herein are illustrative example embodiments and are not intended to otherwise limit the scope of the example embodiments. For the sake of brevity, conventional electronics, control systems, software development, and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the disclosure unless the element is specifically described as "essential" or "critical".

Accordingly, it will be understood by those of ordinary skill in the art that various changes in form and details may be made therein without departing from the spirit and scope of the example embodiments as defined by the following claims.

Example embodiments relate to a device for providing a messenger-based service and/or a method using the same, wherein information desired by a user may be provided in a form of conversation in a messenger. Example embodiments usable in a method of providing a messenger-based service and/or a device for providing a messenger-based service, wherein convenience of using a messenger service is increased by providing desired information according to an intention of a person using the messenger-based service, in a form of conversation in a messenger.

The invention claimed is:

1. A device configured to provide a messenger-based service, the device comprising:
a memory and a processor, the memory containing computer readable instructions executable by the processor to,
receive an inquiry message from a user terminal, the inquiry message being directed to the device via a chat window corresponding to a chat between a chatbot and a user of the user terminal,
generate a template message including at least one keyword slot associated with the inquiry message by using a template associated with the inquiry message among a plurality templates stored in a template database by selecting at least one keyword choice from a keyword group corresponding to the at least one keyword slot, and inserting at least one keyword choice associated with the inquiry message into the at least one keyword slot such that the processor varies an order of inserting the at least one keyword choice into the at least one keyword slot based on keyword determination history information,
transmit the template message to the user terminal via the chat window such that the template message is displayed in the chat window corresponding to the chat between the chatbot and the user,
receive an input message from the user terminal, the input message being directed to the device, the input message corresponding to the template message such that the input message includes at least one value for the at least one keyword slot,
determine a keyword corresponding to the at least one keyword slot based on the input message,
generate a result message including information stored in the template database corresponding to the keyword, and
transmit the result message associated with the inquiry message to the user terminal via the chat window such that the result message is displayed in the chat window corresponding to the chat between the chatbot and the user.

2. The device of claim 1, wherein the processor is configured to, provide an API for modifying the template database, the template database configured to store information for generating the template message, and generate the template message using the template database.

3. The device of claim 1, wherein the processor is configured to instruct the user terminal to display the template message in a chat input window.

4. The device of claim 1, wherein the processor is configured to generate a guide message corresponding to the at least one keyword slot of the template message.

5. The device of claim 1, wherein the processor is configured to determine the keyword from among words included in the input message by selecting one of the words that is same as one or more of the at least one keyword choice included in the keyword group.

6. The device of claim 1, wherein the processor is configured to vary priority of the at least one keyword choice included in the keyword group based on keyword determination history information.

7. The device of claim 1, wherein the processor is configured to, determine the template message from among a plurality of template messages based on a selection input.

8. The device of claim 1, wherein the processor is configured to vary priority of the at least one keyword choice included in the keyword group based on one or more of the user, a location of the user, and a time zone associated with the user.

9. The device of claim 1, wherein the processor is configured to vary the order of inserting the at least one keyword choice into the at least one keyword slot based on one or more of user, a location of the user, and a time zone associated with the user.

10. The device of claim 1, wherein the processor is configured to generate the template message such that the template message is displayed along with signals that signal at least one of a starting location of the at least one keyword slot and an ending location of the at least one keyword slot.

11. A method of providing a messenger-based service by a device, the device including a memory and a processor, the memory containing computer readable instructions executable by the processor, the method comprising:
receiving an inquiry message from a user terminal, the inquiry message being directed to the device via a chat window corresponding to a chat between a particular chatbot for providing particular information and a user of the user terminal;
generating, by the processor, a template message including at least one keyword slot associated with the inquiry message by using a template associated with the inquiry message based on particular chatbot related information registered in a template database among a plurality templates stored in the template database, wherein the template database stores template information, keyword slot information included in each template, and keyword choice information insertable into each keyword slot for respective chatbots;
transmitting the template message to the user terminal via the chat window such that the template message is displayed in the chat window corresponding to the chat between the particular chatbot and the user;
receiving an input message from the user terminal, the input message being directed to the device, the input message corresponding to the template message such that the input message includes at least one value for the at least one keyword slot;
determining, by the processor, a keyword corresponding to the at least one keyword slot based on the input message;
generating, by the processor, a result message that includes information corresponding to the keyword by using a form that has a different user interface from the template used for the template message; and
transmitting the result message associated with the inquiry message to the user terminal via the chat window such that the result message is displayed in the chat window corresponding to the chat between the particular chatbot and the user, wherein
the generating the template message includes generating the template message by selecting at least one keyword choice from a keyword group corresponding to the at least one keyword slot, and inserting at least one keyword choice associated with the inquiry message into the at least one keyword slot such that an order of inserting the at least one keyword choice into the at least one keyword slot varies based on keyword determination history information.

12. A non-transitory computer-readable recording storing computer-readable instructions executable by a processor of a device to cause the processor to, receive an inquiry message from a user terminal, the inquiry message being directed to the device via a chat window corresponding to a chat between a particular chatbot for providing particular information and a user of the user terminal;

generate a template message including at least one keyword slot associated with the inquiry message based on particular chatbot related information registered in a template database by using a template associated with the inquiry message among a plurality templates stored in the template database, wherein the template database stores template information, keyword slot information included in each template, and keyword choice information insertable into each keyword slot for respective chatbots;

transmit the template message to the user terminal via the chat window such that the template message is displayed in the chat window corresponding to the chat between the particular chatbot and the user;

receive an input message from the user terminal, the input message being directed to the device, the input message corresponding to the template message such that the input message includes at least one value for the at least one keyword slot;

determine a keyword corresponding to the at least one keyword slot based on the input message;

generate a result message including information stored in the template database corresponding to the keyword by using a form that has a different user interface from the template used for the template message; and transmit the result message associated with the inquiry message to the user terminal via the chat window such that the result message is displayed in the chat window corresponding to the chat between the particular chatbot and the user, wherein the computer-readable instructions are executable by the processor to cause the processor to generate the template message by selecting at least one keyword choice from a keyword group corresponding to the at least one keyword slot, and inserting at least one keyword choice associated with the inquiry message into the at least one keyword slot such that an order of inserting the at least one keyword choice into the at least one keyword slot varies based on keyword determination history information.

13. The device of claim 1, wherein the chatbot provided by the device is configured to engage in an automated conversation with the user through the template message including the at least one keyword slot.

14. The method of claim 11, wherein the particular chatbot provided by the device is configured to engage in an automated conversation with the user through the template message including the at least one keyword slot.

\* \* \* \* \*